US011324077B2

(12) United States Patent
Pani et al.

(10) Patent No.: US 11,324,077 B2
(45) Date of Patent: May 3, 2022

(54) PRIORITY CHANNELS FOR DISTRIBUTED BROADBAND NETWORK GATEWAY CONTROL PACKETS

(71) Applicant: Juniper Networks, Inc., Sunnyvale, CA (US)

(72) Inventors: Subrat Pani, Acton, MA (US); Balaji Rani, Lincoln, MA (US); Anthony Lanza, Beverly, MA (US); John E. Ziegler, Westborough, MA (US); Shirish B. Dandekar, Hopkinton, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 16/947,861

(22) Filed: Aug. 20, 2020

(65) Prior Publication Data

US 2022/0061129 A1  Feb. 24, 2022

(51) Int. Cl.
*H04W 88/16* (2009.01)
*H04L 12/66* (2006.01)
*H04L 12/46* (2006.01)
*H04W 76/12* (2018.01)

(52) U.S. Cl.
CPC ......... *H04W 88/16* (2013.01); *H04L 12/4633* (2013.01); *H04L 12/66* (2013.01); *H04W 76/12* (2018.02)

(58) Field of Classification Search
CPC .. H04W 88/16; H04W 76/12; H04L 12/4633; H04L 12/66
See application file for complete search history.

(56) References Cited

U.S. PATENT DOCUMENTS

| 2014/0241247 | A1* | 8/2014 | Kempf | H04L 12/4641 370/328 |
| 2018/0097657 | A1* | 4/2018 | Dao | H04L 47/12 |
| 2019/0052580 | A1* | 2/2019 | Peng | H04L 12/4633 |
| 2020/0374956 | A1* | 11/2020 | Zhu | H04W 28/0268 |
| 2021/0127271 | A1* | 4/2021 | Wu | H04W 28/0842 |

OTHER PUBLICATIONS

"TR-459: Control and User Plane Separation for a disaggregated BNG," Issue 1, Jun. 2020, Broadband Forum, 102 pp.
3GPP TS 29.244, "Interface between the Control Plane and the User Plane Nodes," version 16.4.0, dated Jun. 2020, 303 pp.

* cited by examiner

*Primary Examiner* — Saad A. Waqas
(74) *Attorney, Agent, or Firm* — Shumaker & Sieffert, P.A.

(57) ABSTRACT

In general, techniques are described herein for implementing priority channels by prioritizing and communicating control packets on an interface between a disaggregated Broadband Network Gateway control plane and the disaggregated Broadband Network Gateway user plane. In some examples, a method includes assigning, by a disaggregated broadband network gateway (DBNG) user plane device, a control packet for a control protocol to an assigned priority channel of a plurality of priority channels within a common tunnel for a shared interface with a DBNG control plane system, the DBNG user plane device physically separate from the DBNG control plane system; and sending the control packet to the DBNG control plane system using the assigned priority channel.

19 Claims, 4 Drawing Sheets

PRIORITY CHANNELS FOR DISTRIBUTED BROADBAND NETWORK GATEWAY CONTROL PACKETS

TECHNICAL FIELD

Techniques described herein relate to computer networks and, more specifically, to handling control packets for a broadband network gateway.

BACKGROUND

The Broadband Network Gateway (BNG) grants subscribers access to the internet and other services provided by a network service provider. The BNG is a multi-function device that performs subscriber and traffic management functions. These include IP address assignment and management; subscriber authentication, authorization, and accounting (AAA); subscriber session creation and management; bandwidth allocation; policy enforcement; lawful interface; among others. In addition, the BNG is a multi-access edge device that terminates services from a variety of access networks, such as radio access networks (RANs), broadband access networks, public Wi-Fi, hybrid networks, or other fixed wireless or wireline networks. Example broadband services supported by the BNG for a service provider network include internet access, Internet Protocol television (IPTV), Over-the-Top video streaming, Voice over IP (VoIP), other video over IP, video game or other content streaming, subscriber wholesaling, virtual private network services, and so forth.

To accommodate growth in the number of subscribers, the number and types of services being provided by BNGs, and the amount of traffic being processed by BNGs, a disaggregated BNG (DBNG) may be deployed by a service provider. The DBNG physically and logically separates the BNG control plane (CP) and the BNG user plane (UP) (alternatively, the "BNG data plane"). For example, software to perform control plane functions may be distributed for execution by servers as virtualized BNG functions. Devices to implement the DBNG UP, which may include physical network device or virtual user plane devices, remain in the forwarding path between the access networks and the service provider core to process packet flows according to subscriber forwarding state programmed to the network devices by the DBNG CP.

SUMMARY

In general, techniques are described herein for implementing priority channels by prioritizing and communicating control packets on an interface between a disaggregated Broadband. Network Gateway control plane and the disaggregated Broadband Network Gateway user plane. In conjunction with the multi-service delivery, the DBNG CP processes control packets for a variety of control protocols having different time sensitivities, importance of the functions being supported, and so forth. In some examples, a DBNG UP device and a physically separate DBNG CP system implement a shared interface to communicate packets belonging to different control protocols on different priority channels within a common, shared tunnel. The shared interface may be an implementation of the Control Packet Redirection Interface (CPRI) described in "TR-459: Control and User Plane Separation for a disaggregated BNG," Issue 1, June 2020. Broadband Forum, which is incorporated by reference herein in its entirety.

The techniques may provide one or more technical advantages that realize at least one practical application to the computer-related field of computer networking. For example, a shared interface having multiple priority channels, to which different control protocol packets (hereinafter, "control packets") may be assigned for transport, facilitates reduced head-of-line blocking that may occur in implementations having a single channel for the shared interface. Control packets requiring low-latency handling, such as Layer 2 Tunneling Protocol (L2TP), may be sent by the DBNG UP to the DBNG CP using a higher-priority channel. The DBNG CP may prioritize processing control packets received on relatively higher-priority channels over control packets received on relatively lower-priority channels to improve the likelihood of meeting the specific requirements of the control packets' respective protocols. This may reduce instances of dropped subscriber sessions, reduce dropped control packets, and may improve the reliability of DBNG to provide services.

In one example, a method comprises: assigning, by a disaggregated broadband network gateway (DBNG) user plane device, a control packet for a control protocol to an assigned priority channel of a plurality of priority channels within a common tunnel for a shared interface with a DBNG control plane system, the DBNG user plane device physically separate from the DBNG control plane system; and sending, by the DBNG user plane device, the control packet to the DBNG control plane system using the assigned priority channel.

In another example, a Disaggregated Broadband Network Gateway User Plane device comprises: memory; and processing circuitry coupled with the memory, the processing circuitry and memory being configured to: assign a control packet for a control protocol to an assigned priority channel of a plurality of priority channels within a common tunnel for a shared interface with a physical separate DBNG control plane system; and send the control packet to the DBNG control plane system using the assigned priority channel.

In another example, a Disaggregated Broadband Network Gateway system comprises a Disaggregated Broadband Network Gateway User Plane device configured to: assign a control packet for a control protocol to an assigned priority channel of a plurality of priority channels within a common tunnel for a shared interface with a Disaggregated Broadband Network Gateway Control Plane system; and send the control packet to the Disaggregated Broadband Network Gateway Control Plane system using the assigned priority channel. The Disaggregated Broadband Network Gateway system also comprises a Disaggregated Broadband Network Gateway Control Plane device configured to: receive the control packet on the assigned priority channel; and process the control packet according to a priority associated with the assigned priority channel.

The details of one or more aspects of the techniques are set forth in the accompanying drawings and the description below. Other features, objects, and advantages of the techniques will be apparent from the description and drawings, and from the claims.

BRIEF DESCRIPTION OF DRAWINGS

Like reference characters denote like elements throughout the figures and text.

DETAILED DESCRIPTION

Figure 1:
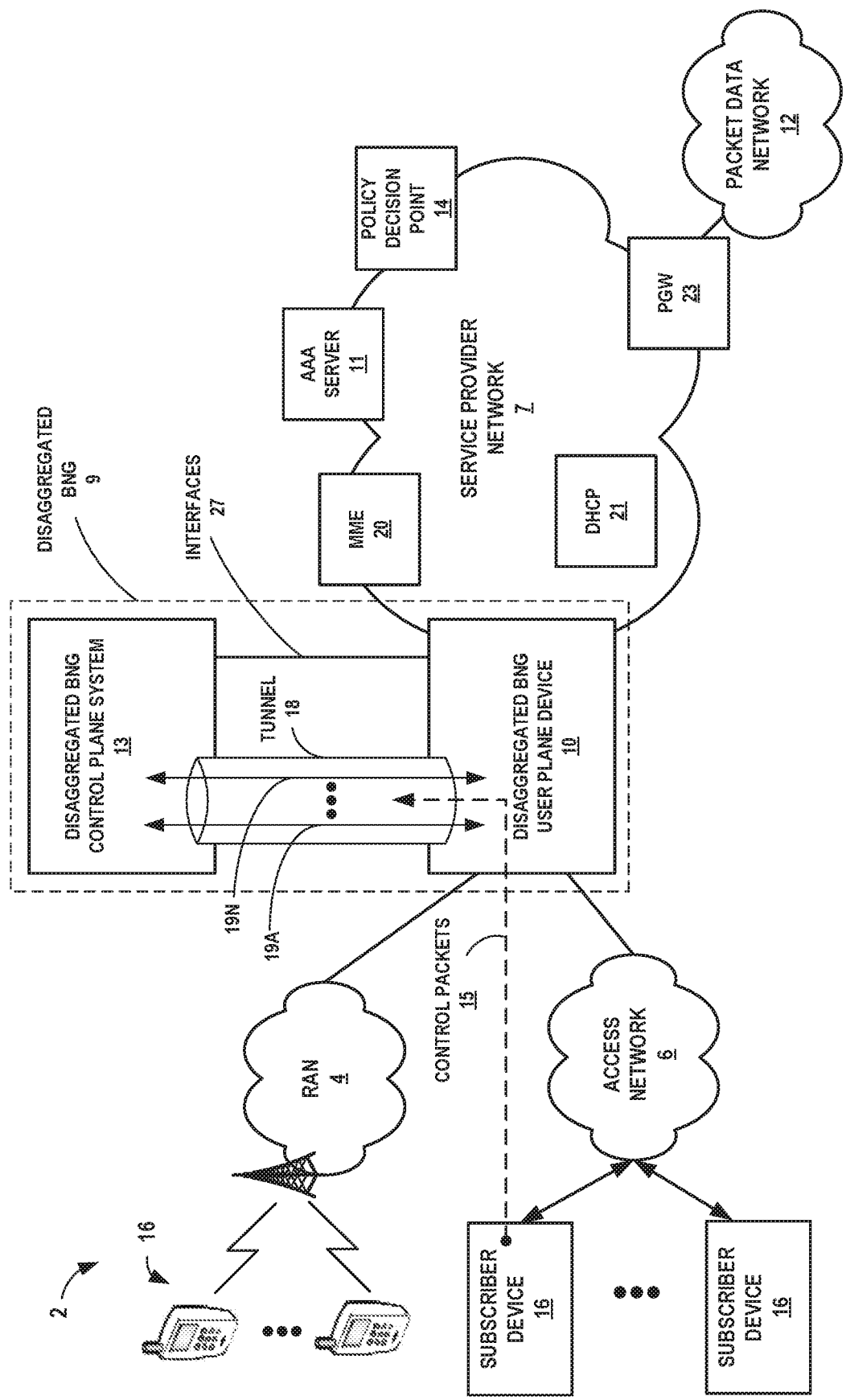
FIG. 1 is a block diagram illustrating a network system having a disaggregated broadband network gateway that supports providing services in part by processing control packets in accordance with various aspects of the techniques described in this disclosure.

FIG. 1 is a block diagram illustrating a network system 2 having a disaggregated broadband network gateway 9 ("BNG 9") that supports providing services in part by processing control packets in accordance with various aspects of the techniques described in this disclosure. In this example, network system 2 includes service provider network 7 coupled to access networks via DBNG 9 and, more particularly, by disaggregated broadband network gateway user plane device 10 ("DBNG UP device 10").

Service provider network 7 supports one or more packet-based services that are available for request and use by subscriber devices 16A-16N (collectively, "subscriber devices 6"). As examples, service provider network 7 may provide (or connect to packet data network (PDN) 12 that provides) Internet access, bulk data delivery, subscriber wholesaling, virtual private network services, or customer-specific application services. Service provider network 7 may include, for instance, a local area network (LAN), a wide area network (WAN), the Internet, a virtual LAN (VLAN), an enterprise LAN, a layer 3 virtual private network (VPN), an IP intranet operated by a network service provider that may also operate access network 6 and/or radio access network 4, an enterprise IP network, or some combination thereof. Service provider network 7 includes a core network connected to DBNG UP device 10. various examples, service provider network 7 may be connected to a public WAN, the Internet, content delivery networks, other service provider networks, or to other networks. In the illustrated example, service provider network 7 is connected to packet data network 12.

Service provider network 7 implements one or more packet data protocols (PDPs), such as IP (IPv4 and/or IPv6), X.25 or Point-to-Point Protocol (PPP), to enable packet-based transport of service provider network 7 services. Services provided by service provider network 7 to subscriber devices 16 may enable delivery of internet content, Internet Protocol television (IPTV), Over-the-Top video streaming, Voice over IP (VoIP), other video over IP, video game or other content streaming, Short Messaging Service (SMS), Wireless Application Protocol (WAP) service, and Telnet, for example. Packet data network gateway (PGW) 23 is an edge router of service provider network 7 specifically for cellular service provider networks. DBNG CP system 13 and DBNG UP device 10 may communicate with PGW 23 to provide cellular/broadband access to subscriber devices 16. In some examples, RAN 4 is connected to PGW 23 as an access network for a cellular network separate from service provider network 7.

DBNG UP device 10 couples one or more access networks of network system 2 to service provider network 7 (more specifically, to the service provider core network). Access networks consist of links that connect subscriber devices 16 and/or other end system or end user device to DBNG UP device 10. Illustrated access networks include radio access network (RAN) 4 and access network 6. Radio access network 4 represents a radio access network for a cellular service provider network. RAN 4 connects wireless subscriber devices 16 to a mobile core network via DBNG UP device 10 and provides access control, packet routing and transfer, mobility management, security, radio resource management, and network management. Radio access network 4 may represent, for example, a GSM Radio Access Network (GRAN), a WiMAX radio access network, a UMTS Radio Access Network (UTRAN), or an evolution of a UTRAN known as an E-UTRAN. Radio access network 4 may include one or more Node Bs, evolved Node Bs (or "eNodeBs"), or wireless access points, for example. Other embodiments of radio access network 4 may include additional base stations, as well as intermediate devices such as radio network controllers (RNCs).

Access network 6 may represent a wireline or wireless access network. For example, access network 6 may be, for instance, an Ethernet, wireless local area network (LAN), asymmetric digital subscriber line (ADSL), cable, or other broadband access network. The elements of access network 4 may support any one or more of a variety of protocols, such as IP, Frame Relay, Asynchronous Transfer Mode (ATM), Ethernet, Point-to-Point Protocol (PPP), Point-to-Point Protocol over Ethernet (PPPoE), General Packet Radio Service (GPRS) tunneling protocol (GTP), and virtual local area network (VLAN)-related protocols, among others. Using any one or more of these protocols, any of subscriber devices 16 may present authentication credentials to DBNG UP device 10 to request access to a service provider network 7 service. For example, a subscriber device 16 may send credentials, such as a username and password, to DBNG UP device 10 to request access to a service provided by service provider network 7. Subscriber devices 16 may send credentials using, for instance, a PPP Password Authentication Protocol (PAP) authentication request packet to DBNG UP device 10.

Subscriber devices 16 connect to DBNG 9 via access networks to receive connectivity to service provider network 7 services (e.g., the Internet) for applications hosted by subscriber devices 16. Each of subscriber devices 16 may represent, for example, a workstation, desktop computer, laptop computer, cellular or other mobile device, Personal Digital Assistant (PDA), gaming console, television set-top box, smart phone, tablet computer, or any other device capable of accessing a computer network via a wireless and/or wired connection. Each of subscriber devices 16 may be associated with a subscriber (e.g., a human). In this example, any of subscriber devices 6 may connect to DBNG 10 in order to access service provider network 7.

An administrator of service provider network 7 (a network service provider) may deploy DBNG 9) to function as a gateway to one or more services provided by service provider network 7. DBNG 9 is a disaggregated (also known as "distributed") Broadband Network Gateway that physically and logically separates the BNG control plane (CP) and the BNG user plane (UP) (alternatively, the "BNG data plane") into Disaggregated BNG Control Plane system 13 ("DBNG CP system 13") and DBNG UP device 10, respectively.

DBNG CP system 13 represents one or more real or virtual devices that generally perform the control plane functionality for DBNG 9. Control plane functionality includes multiple control plane functions, such as subscriber session termination, performing signaling protocols such as Point-to-Point Protocol over Ethernet (PPPoE), IP over Ethernet (IPoE), IP address assignment and management, authentication/authorization/accounting (AAA), policy enforcement, gateway operations, lawful intercept, local management, keep-alive message processing, and configuring DBNG UP device 10.

DBNG CP system 13 communicates with other systems of service provider network 7 to perform the control plane functions. In the illustrated example, DBNG CP system 13 may communicate with Dynamic Host Configuration Protocol (DHCP) server 21 to assign IP addresses to subscriber devices 16. DBNG CP system 13 may communicate with Mobility Management Entity (MME) 20 set up tunnels for subscriber devices 16 to communicate on cellular networks. DBNG CP system 13 may communicate with policy decision point 14, an example of a policy server, to obtain policy rules that determine Quality-of-Service (QoS) and user and request authorization, for instance. DBNG CP system 13 may communicate with AAA server 11 to process user request for access to resources and generally to obtain AAA services, such as uploading accounting information for subscriber device 16, authenticating a subscriber, and so forth.

DBNG UP device 10 is a device or component (e.g., board or service card) implemented within a network device (such as a router) that provides access to service provider network 7. For example, DBNG UP device 10 may represent and/or incorporate a network access server that provides dial-up or virtual private network (VPN) services to an enterprise LAN, a remote access server (e.g., broadband remote access server) or broadband services router that aggregates outputs from one or more access nodes (e.g., Digital Subscriber Line Access Multiplexers (DSLAMs), DSL access, fiber-to-the-home (FTTH) passive optical network (PON), access, etc.) into a higher-speed uplink to service provider network 7, a wireless access point (WAP) providing wireless physical layer access to service provider network 7, or switches that use other LAN-based (e.g., Ethernet) technologies to provide wired physical layer access to service provider network 7.

While illustrated and primarily described with respect to a single DBNG UP device 10, service provider network 7 may include multiple DBNG UP devices serving multiple access networks serving many thousands or even millions of subscriber devices 16. For example, different areas of a country or region may have deployed thereto respective instances of DBNG UP device 10 so that subscriber devices 16 located in the different areas may each have a relatively geographically close DBNG UP device 10 to reduce communication latencies for data traffic with service provider network 7. However, DBNG CP system 13 may be centrally located at a core data center or branch office, for instance, to process control packets received from any of the DBNG UP devices and to configure all of the DBNG UP devices. Multiple instances of DBNG UP device 10 may be located in a single area or device to support a larger number of subscriber devices 16 in that area or device. DBNG CP system 13 selects the appropriate DBNG UP device 10 to handle subscriber data traffic for a subscriber device 16.

DBNG CP system 13 and DBNG UP device 10 communicate using one or more interfaces 27. DBNG CP system 13 may include a user interface by which an operator can manage configurations of DBNG UP device 10. Interfaces 27 may include, for instance, a management interface for publishing operational data of DBNG UP device 10 and resource information, events and alarms between DBNG CP system 13 and DBNG UP device 10, and descriptions of hardware of DBNG UP device 10 such as ports and hardware interfaces. Interfaces 27 may include a state control interface by which DBNG CP system 13 and DBNG UP device 10 communicate subscriber state control information, such as traffic detection and forwarding rules and related states. DBNG UP device 10 forwards subscriber data traffic based on the traffic detection and forwarding rules programmed by DBNG CP system 13 via interfaces 27. In general, traffic detection and forwarding rules are based on session identification for subscriber data traffic and one or actions to be applied to the identified subscriber data traffic. DBNG CP system 13 and DBNG UP device 10 may implement the state control interface at least in part using Packet Forwarding Control Protocol (PFCP) standardized for use with 3GPP. Additional description for PFCP is found in 3GPP TS 29.244, "Interface between the Control Plane and the User Plane Nodes," version 16.4.0, dated June 2020, which is incorporated by reference herein in its entirety.

Interfaces 27 may also include an implementation of the Control Packet Redirection Interface (CPRI) described in "TR-459: Control and User Plane Separation for a disaggregated BNG," Issue 1, June 2020, Broadband Forum. In general, the CPRI is the interface by which DBNG UP device 10 "redirects" control packets, originated by subscriber devices 16 or residential gateways (DSL gateways or cable modems) or other access network devices and received by DBNG UP device 10, to DBNG CP system 13. The control packets are in effect redirected from the DBNG UP device 10 to the appropriate device(s) of DBNG CP system 13 that are capable of processing the control packets. This interface of the DBNG UP device 10 toward the access networks may be referred to as the V interface. The CPRI is also the interface by which DBNG CP system 13 returns control packets to DBNG UP device 10 for output toward the access networks.

For example, DBNG UP device 10 may receive a DHCP Discover message from a subscriber device 16 via access network 6 and redirect the DHCP Discover message to DBNG CP system 13 via the CPRI. DBNG CP system 13 processes the DHCP Discover message and returns a DHCP Offer message to DBNG UP device 10 via the CPRI. DBNG UP device 10 sends the DHCP Offer message to the subscriber device 16 via access network 6.

FIG. 1 illustrates multiple control packets 15. Each of control packets 15 may conform to any one of a variety of control protocols that typically operate on the interface of a BNG and access network, such as L2TP, DHCP, PPPoE, IPoE, PPP, PPP over ATM, and others. Each of control packets 15 may represent, for instance, a DHCP Discovery or Solicit message, a PPPoE PADI, message, or a Layer 2 Tunneling Protocol (L2TP) message. Control packets 15 may be originated by subscriber devices 16 or by an access network device, such as a Wi-Fi access point, DSL, router, cable modem, DSLAM, Cable Modem Termination System, or another device. The control protocols may be control protocols used by control plane functions of a broadband network gateway.

Different control protocols to which control packets 15 conform, and different types of control packets within a given control protocol, have different characteristics defining receipt and processing latency requirements for setup and keep-alive (heartbeat), required frequency of keep-alive messages, port address requirements, importance of the BNG control function being supported, and so forth. An operator or other agent may map these requirements to control protocol service classes to specify that control packets for a particular protocol should be classified to a service class for that protocol and handled according to a service priority for that service class. For example, L2TP has a relatively fast keepalive packet response requirement (if the server during an L2TP keepalive-timeout period does not receive any packets, the server sends five keepalive packets, one every second—if the client does not respond it is disconnected). The operator may map L2TP to a particular low-latency service class that defines control packet handling parameters for this service class in an attempt to meet this response requirement. Other control protocols, such as DHCP, may have much higher latency requirements and be assigned to service classes that define control packet handling parameters that have less stringent response latency requirements. As another example, some control functions may be higher priority than others because such control functions are more sensitive to control packet drops, more disruptive to subscribers or the network upon control packet drops, more important to the network operation, more important due to government regulation or business requirements, and so forth. An operator may assign control protocols to service classes according to the importance of the control functions that such control protocols support.

In some cases, an operator may assign different control packets for a control protocol to different control protocol service classes. For example, DHCPv4 Discover, DHCPv6 Solicit, and PPP PADI messages may be assigned to a low priority service class, while DHCPv4 Offer/Request/Release, DHCPv6 Reply, and PPP PADO messages may be assigned to medium priority service class. This assignment of control packets to different control protocol service class may be fixed or configurable within a DBNG operating according to techniques of this disclosure.

In accordance with techniques described in this disclosure, DBNG UP device 10 and DBNG CP system 13 establish a common tunnel 18 to exchange control packet traffic for control packets between DBNG UP device 10 and the access networks. This tunnel may be used to implement the CPRI. Tunnel 18 may represent an Internet Protocol tunnel (IP-in-IP), a GPRS Tunneling Protocol (GTP) tunnel (GTP-C or GTP-U), a Generic Routing Encapsulation Tunnel, or other tunnel. DBNG UP device 10 may have a single tunnel with DBNG CP system 13, while DBNG CP system 13 may have multiple tunnels with respective DBNG UP devices 10. Tunnel 18 may be associated with a particular priority for the tunnel encapsulation protocol used to implement tunnel 18. For example, for a tunnel 18 that is a GTP tunnel, all GTP traffic for tunnel 18 may be marked as high priority according to GTP in order to facilitate prompt processing of any control packet transported using tunnel 18 between DBNG UP device 10 and DBNG CP system 13.

In some cases, the tunnel endpoint for the DBNG CP system 13 side of tunnel 18 may be a request router, load balancer, or other real or virtual device that routes control packets 15 to appropriate devices for DBNG CP system 13 that can process the control packets 15. For example, a first server or virtual machine/container of DBNG CP system 13 may process DHCP messages, while a second server or virtual machine/container of DBNG CP system 13 may process LT2P messages. The tunnel endpoint may, accordingly, send DHCP messages to the first server or virtual machine/container and send L2TP messages to the second server or virtual machine/container.

Tunnel 18 may be a common tunnel that transports multiple priority channels 19A-19N (collectively, "priority channels 19") for respective control protocol service classes. Each of priority channels 19 may be a separate IP channel that is transported by tunnel 18. Each of priority channels 19 may be a separate Transport Control Protocol (TCP) connection or User Datagram Protocol channel that is transported by tunnel 18. For example, priority channels 19 may be separate IP channels, TCP connections, or UDP channels transported by a GTP tunnel that is tunnel 18. Priority channels 19 may be associated with different TCP/UDP ports of DBNG UP device 10 and DBNG CP system 13. While illustrated as bi-directional, priority channels 19 include channels that may be bi-directional or pairs of channels between tunnel 18 endpoints that are unidirectional. A priority channel is "transported" by tunnel 18 in that the endpoints for tunnel 18 encapsulate packets sent on the priority channel with a tunnel encapsulation header for tunnel 18, e.g., a GTP, IP-in-IP, or GRE header. Priority channel 19A may be a highest priority, priority channel 19N a lowest priority, and other channels 19 may have priorities between the highest and lowest priorities.

Priorities for channels 19 may be indicated in outputted packets. For example, each of channels 19 may be assigned a different service class for Differentiated Service Code Points (DSCPs) in Type of Service (ToS) fields, and packets sent using a channel marked with the bits appropriate for the service class assigned to that channel. As another example, each TCP connection or UDP stream may be associated internally in each of the tunnel 18 endpoints, using configuration data, with various data structures and/or priority-based processing mechanism for handling control packets 15, to be sent on or that have been received on the priority channels, according to priority. This may include weighted queues for received control packets, for instance, in which queues associated with higher-priority channels 19 are attended to more quickly and/or more frequently. As such, the TCP or UDP port indicated in control packet encapsulation headers may indicate the respective priority channels for the control packets 15. Additional priority-based processing mechanisms are described below.

DBNG UP device 10 receives control packets 15 from access networks. For each of control packets 15, DBNG UP device 10 classifies the control packet to one of the control protocol service classes described above. DBNG UP device 10 is configured with a mapping of control protocol service classes to respective priority channels 19. DBNG UP device 10 maps the control packet to a priority channel of priority channels 19 that is mapped to the control protocol service class for the control packet and outputs the control packet on the priority channel.

Tunnel endpoints for tunnel 18, i.e., DBNG UP device 10 and DBNG CP system 13, may treat control packets 15 received on channels 19 differently by channel, according to the priority accorded the channel by the tunnel endpoints. As noted above, a control packet of control packets 15 received by DBNG CP system 13, for instance, has a tunnel encapsulation header that includes an indication of the priority channel 19 that is transporting the control packet. DBNG CP system 13 maps the indication to data structures and/or priority-based processing mechanism in order to process the control packet according to its priority. For example, DBNG CP system 13 may process a first control packet that is received on a higher-priority priority channel earlier than a second control packet that is received on a lower-priority priority channel even though the second control packet is received earlier.

DBNG CP system 13 may receive control packets 15 on priority channels 19 in different tunnels 18 in this way from multiple DBNG UP devices 10. DBNG CP system 13 may nevertheless process all received control packets 15 together. For example, DBNG CP system 13 may add all control packets 15, sent on the highest-priority priority channels 19 for multiple tunnels 18 and received from multiple DBNG UP devices 10 that are endpoints of those tunnels 18, to the same receive queue. Therefore, DBNG CP system 13 may process a first control packet that is received on a higher-priority priority channel from a first instance of DBNG UP device 10 earlier than a second control packet that is received on a lower-priority priority channel even though the second control packet is received earlier from a second instance of DBNG UP device 10, However, DBNG CP system 13 may process a first control packet that is received on the highest-priority priority channel from a first instance of DBNG UP device 10 later than a second control packet that is received on a highest-priority priority channel when the second control packet is received earlier from a second instance of DBNG UP device 10.

Although described primarily with respect to control packets 15 received by DBNG UP device 10 and received from access networks and redirected to DBNG CP system 13, the techniques are similarly applicable to control packets sent by DBNG CP system 13 to DBNG UP device 10, which may be responsive to control packets 15.

In this way, the shared interface of interfaces 27 for control packets to be exchanged between DBNG CP system 13 and one or more instances of DBNG UP device 10 may implement multiple priority channels, to which different control packets may be assigned for transport. This technique may facilitate reduced head-of-line blocking that may occur in implementations having a single channel for the shared interface. Control packets requiring low-latency handling, such as Layer 2 Tunneling Protocol (L2TP), may be sent by the DBNG UP device 10 to the DBNG CP system 13 using a higher-priority channel. The DBNG CP system 13 may prioritize processing control packets received on relatively higher-priority priority channels 19 over control packets received on relatively lower-priority channels priority channels 19 to improve the likelihood of meeting the specific requirements of the control packets' respective protocols. This may reduce instances of dropped subscriber sessions, reduce dropped control packets, and may improve the reliability of DBNG to provide services.

Figure 2:
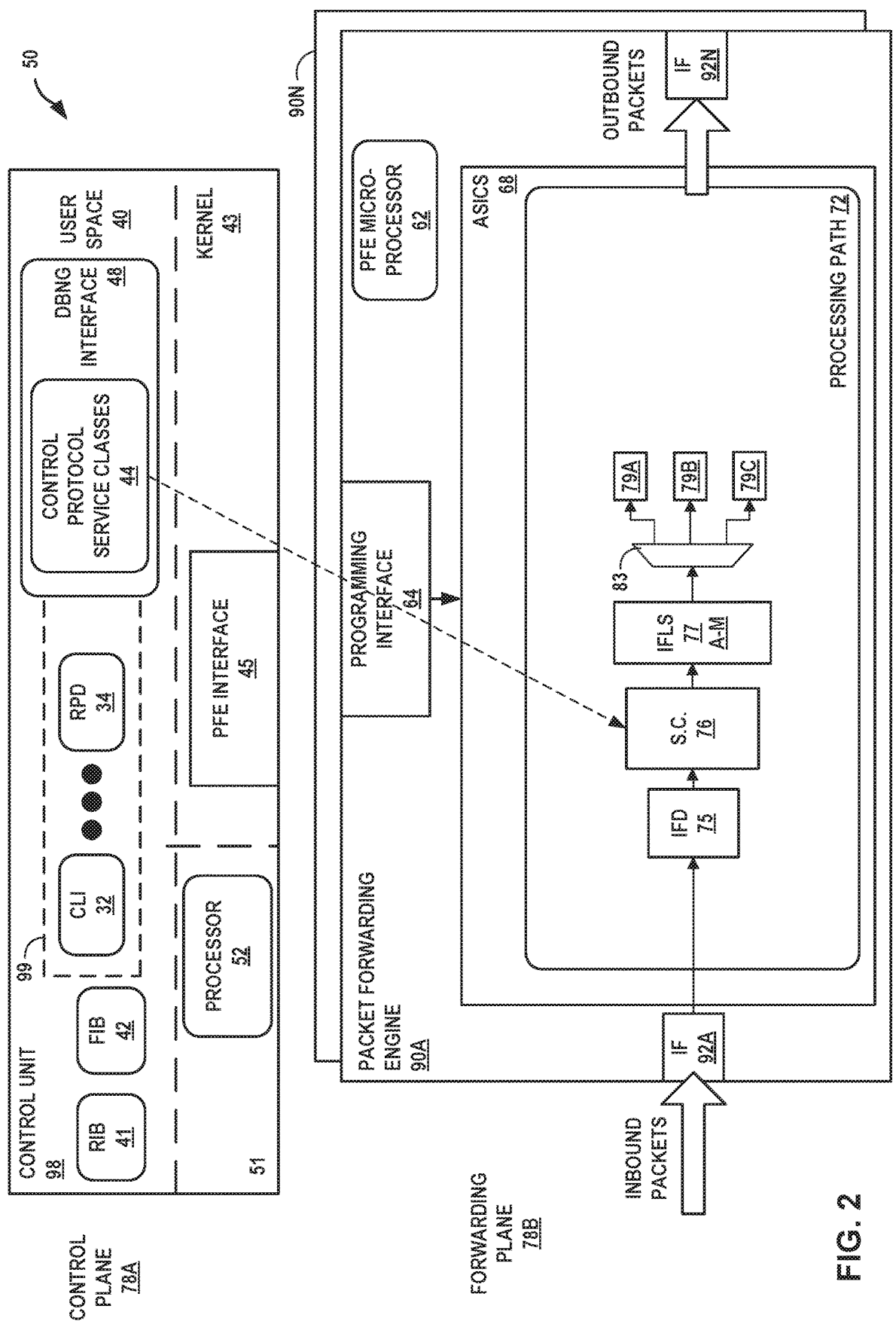
FIG. 2 is a block diagram illustrating, in further detail, an example instance of a network device operating as an instance of a disaggregated broadband network gateway user plane device, according to techniques described herein.

FIG. 2 is a block diagram illustrating, in further detail, an example instance of a network device 50 operating as an instance of a DBNG UP device 10, according to techniques described herein. Network device 50 may comprise a router or other network device configured to operate as a network gateway, such as a BNG. Network device 50 may represent an example instance of DBNG UP device 10 of FIG. 1.

In this example, network device 50 includes a control unit 98 that provides control plane 78A functionality for the device. Control unit 98 may be distributed among multiple entities, such as one or more routing units and one or more service cards insertable into a chassis. In such instances, network device 50 may therefore have multiple control planes. Network device 50 also includes a plurality of forwarding components in the form of packet forwarding engines 90A-90N ("PFEs 90") and a switch fabric 26 that together provide a forwarding plane 78B for forwarding and otherwise processing subscriber traffic. Other types of forwarding components may include packet processors, ASIC-based packet processors, or other specialized hardware-based packet processors that executes software for processing and forwarding packets. PFEs 90 receive and send data packets via physical interfaces 92A-92N of interface cards each associated with a respective one of PFEs 90.

Each of PFEs 90 and its associated ones of IFCs 92 may reside on a separate line card for network device 50 (not shown). However, a line card may include multiple PFEs 90. Example line cards include flexible programmable integrated circuit (PIC) concentrators (PFCs), dense port concentrators (DPCs), and modular port concentrators (MPCs). Each of interfaces 92 may support one of a variety of layer two (L2) technologies, including Ethernet, Gigabit Ethernet (GigE), and Synchronous Optical Networking (SONET) interfaces. A switch fabric (not shown) provides a high-speed interconnect for forwarding incoming data packets to the selected one of PFEs 90 for output over a network.

Control unit 98 is connected to each of PFEs 90 by internal communication links. Internal communication links may comprise a 100 Mbps or 1 Gbps Ethernet connection, for instance. Daemons 99 executed by control unit 98 are user-level processes that run network management software, execute routing protocols to communicate with peer routing devices, execute configuration commands received from an administrator, maintain and update one or more routing tables, manage subscriber flow processing, manage DBNG control packet processing, and create one or more forwarding tables for installation to PFEs 90, among other functions, Daemons 99 in this example include command line interface (CLI) 32, routing protocol daemon (RPD) 34, Simple Network Management Protocol (SNMP) daemon 36, and DBNG interface 48. In this respect, control plane 78A may provide routing plane, service plane, and management plane functionality for network device 50. Various instances of control unit 98 may include additional daemons not shown in FIG. 2 that perform other control, management, or service plane functionality and/or drive and otherwise manage forwarding plane functionality for network device 50. Control unit 98 may in some instances represent a control unit of a service card or a combination of control units of a routing unit that provides routing plane functionality and a service card.

Daemons 99 operate over and interact with kernel 43, which provides a run-time operating environment for user-level processes. Kernel 43 may comprise, for example, a UNIX operating system derivative such as Linux or Berkeley Software Distribution (BSD). Kernel 43 offers libraries and drivers by which daemons 99 may interact with the underlying system. PFE interface 45 of kernel 43 comprises a kernel-level library by which daemons 99 and other user-level processes or user-level libraries may interact with programming interface 64 of PFE 90A. PFE interface 45 may include, for example, a sockets library for communicating with PFE 90A over dedicated network links.

Hardware environment 51 of control unit 98 comprises one or more processors 52 having processing circuitry that executes software instructions, such as those used to define a software or computer program including both kernel 43 and user space 40, stored to a computer-readable storage medium (not shown in FIG. 2), such as non-transitory computer-readable mediums including a storage device (e.g., a disk drive, or an optical drive) and/or a memory such as random-access memory (RAM) (including various forms of dynamic RAM (DRAM), e.g., DDR2 SDRAM, or static RAM (SRAM)), Flash memory, another form of fixed or removable storage medium that can be used to carry or store desired program code and program data in the form of instructions or data structures and that can be accessed by a processor, or any other type of volatile or non-volatile memory that stores instructions to cause the one or more processors 52 to perform techniques described herein. Alternatively, or in addition, control unit 98 may include dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

Microprocessor 52 may comprise one or more general- or special-purpose processors such as a digital signal processor (DSP), an application specific integrated circuit (ASIC), a field programmable gate array (FPGA), or any other equivalent logic device. Accordingly, the terms "processor" or "controller," as used herein, may refer to any one or more of the foregoing structures or any other structure operable to perform techniques described herein.

RPD 34 executes one or more interior and/or exterior routing protocols to exchange routing information with other network devices and store received routing information in routing information base 41 ("RIB 41"). RIB 41 may include information defining a topology of a network, including one or more routing tables and/or link-state databases. RPD 34 resolves the topology defined by routing information in RIB 41 to select or determine one or more active routes through the network and then installs these routes to forwarding information base 42 ("FIB 42"). Typically; RPD 34 generates FIB 42 in the form of a radix or other lookup tree to map packet information (e.g., header information having destination information and/or a label stack) to next hops and ultimately to interface ports 92 of interface cards associated with respective PFEs 90.

Command line interface daemon 32 ("CLI 32") provides a shell by which an administrator or other management entity may modify the configuration of network device 50 using text-based commands. Simple Network Management Protocol daemon 36 ("SNMP 36") comprises an SNMP agent that receives SNMP commands from a management entity to set and retrieve configuration and management information for network device 50. Using CLI 32 and SNMP 36, for example, management entities may enable/disable and configure services, manage classifications and class of service for packet flows, install routes, enable/disable and configure rate limiters, configure traffic bearers for mobile networks, and configure interfaces, for example. RPD 34, CLI 32, SNMP 36, and DBNG interface 48 in this example configure forwarding plane 78B via PFE interface 45.

PFEs 90 process packets by performing a series of operations on each packet over respective internal packet processing paths as the packets traverse the internal architecture of network device 50. Operations may be performed, for example, on each packet by any of a corresponding ingress interface, an ingress PFE 90, an anchor PFE 90, an egress PFE 90, an egress interface or other components of network device 50 to which the packet is directed prior, such as one or more service cards. PFEs 90 each include instructions that, when executed, examine the contents of each packet (or another packet property, e.g., incoming interface) and on that basis make forwarding decisions, apply filters, and/or perform accounting, management, traffic analysis, class of service decisions, lawful intercept, and load balancing, for example. In one example, each of PFEs 90 arranges instructions as next hop data that can be chained together as a series of "hops" along an internal packet processing path for the service node. The result of packet processing determines the manner in which a packet is forwarded or otherwise processed by PFEs 90 from its input physical interface 92 to its output physical interface 92. A particular packet may be processed by, multiple PFEs 90.

PFE interface 45 presents an interface by which daemons 99 may configure PFEs 90 with instructions for processing packet flows. Daemons 99 direct PFEs 90 via PFE interface 45 to install logical interfaces (IFLs) 77 with which PFEs 90 process packet flows. Each of PFEs 90 may include zero or more IFLs 77. PFE interface 45 may comprise one or more user- or kernel-level libraries, programs, toolkits, application programming interfaces (APIs) and may communicate control and data messages to PFEs 90 via internal communication links using sockets, for instance.

For example, CLI 32 may execute a command line interface that receives, from a user, a logical interface configuration for a physical network interface. In response, daemons 99 invoke PFE interface 45 to configure the packet forwarding path to implement the logical interface configuration.

PFE interface 45 allows control plane 78A processes to drive the installation and configuration of packet processing path 72 of PFE 90A. In particular, PFE interface 45 includes an application programming interface (API) by which daemons 99 including DBNG interface 48 may configure processing path 72 with interfaces and instructions and map packet flows to logical interfaces for processing.

PFE 90A, in combination with other PFEs 90 of network device 50, implements forwarding plane 78B (also known as a "data plane") functionality to handle packet processing from ingress interfaces on which packets are received to egress interfaces to which packets are sent. Forwarding plane 78B determines data packet forwarding through network device 50, applies services, rate limits packet flows, filters packets, and otherwise processes the packets using instructions and lookup data installed by control plane 78A to forwarding plane 78B. While FIG. 2 illustrates only PFE 90A in detail, each of PFEs 90 of network device 50 comprises similar modules that perform substantially similar functionality.

PFE 90A includes application-specific integrated circuit (ASIC)-based packet processors ("ASICs 68") that map packets internal forwarding paths of processing path 72 and execute processing path 72 in accordance with techniques described herein. ASICs 68 include one or more programmable application-specific integrated circuits having key engines that execute microcode (or "microinstructions") to control and apply fixed hardware components of ASICs 68 to process packet "keys." A packet key includes packet fields and other parameters that determine a flow of packet processing for the packet along an internal processing path configured in processing path 72. Key engines include key buffers to store packet field data for corresponding packets that the key engine is currently processing. Key buffers may also provide limited writable memory to which elements of the internal processing path may write to pass messages accessible by future elements. Some instances of ASICs 68 may include a plurality of key engines each having an associated key buffer and record buffer.

PFE microprocessor 62 manages ASICs 68 and executes programming interface 64 to provide an interface for/to control unit 98. PFE microprocessor 62 may execute a microkernel to provide an operating environment programming interface 64 and other software. Programming interface 64 receives messages from control unit 98 directing packet forwarding engine 90A to configure the elements of processing path 72.

Internal processing path 72 ("processing path 72") of ASICs 68 comprises elements including programmable, executable microcode and fixed hardware components that determine the packet processing actions and other operations performed by ASICs 68. Processing path 72 may include, for example, executable instructions, programmable logic, and application-specific logic that perform lookups, rate limit packet flows, count packets, implement classes of service, perform lawful intercept, classify packets, apply filters, route packets, and manipulate packet keys, among other functions. PFE 90A may store executable instructions of processing path 72 in computer-readable storage media, such as static random access memory (SRAM). While illustrated within ASICs 68, executable instructions of processing path 72 may be stored in memory external to ASICs 68 onboard PFE 90A.

In some aspects, one or more instructions of processing path 72 comprise a next hop data structure to initiate processing. At the end of each processing step by ASICs 68, the result is a next hop that may specify additional processing or the termination of processing, for instance. In addition, next hops may specify one or more functions to be executed by ASICs 68 and/or one or more hardware elements to be applied (e.g., policers). Next hops thus form the primary data structure that can be used to initiate a service, chain next hops to allow for multiple processing steps to be performed with respect to a single packet, and terminate an internal processing path.

In some examples, DBNG interface 48 may be a user-plane process or other executable code for configuring PFEs 90 to cause PFEs 90 to provide, to control unit 98, indications of control protocol service classes for control packets received at PFEs 90. In some examples, DBNG interface 48 may be a user-plane process or other executable code for configuring PFEs 90 to cause PFEs 90 to classify control packets to control protocol service classes and to output control packets for transport on corresponding priority channels for the control protocol service classes.

DBNG interface 48 stores control protocol service classes 44, which may be configured by a user/administrator/operator using CLI 32. Control protocol service classes 44 includes data for mapping control packet 15 received by network device 50 from access network. Classification data may include data usable for control protocol identification and for control packet type identification within control protocols, including control protocols and control protocol messages described above, e.g., L2TP message, DHCP Request/Response, and so forth. Control protocol service classes 44 associates control protocol messages with different service classes. Control protocol service classes 44 may further associate one or more service classes with each of a plurality of priorities, which may correspond to respect priority channels as described in FIG. 1.

In the illustrated example, processing path 72 includes elements in the form of executable instructions and lookup data structures, in some cases configured as interfaces, that define processing paths for packets received at a particular physical network interface 92A. Processing path 72 includes device interface (IFD) 75, service classifier 76, logical interfaces 77, a selector block 83, and service class operations 79A-79C each associated with one or more priority channels 19 implemented by DBNG interface 48 for communicating via a common tunnel with a DBNC CP system 13.

Device interface 75 may include device-specific instructions for the physical network interface 92A for processing all packets received at physical network interface 92A.

Control unit 98 programs service classifier 76 with classification data generated from control protocol service classes 44. Service classifier 76 applies the classification data to identify, for each control protocol control packet received by PFE 90A, a service class for the control packet. Based on the identified service class, the corresponding one of logical interfaces 77 for the service class may apply additional common operations and/or operations specific to handling control packets for that service class.

Logical interfaces 77 ("IFLs 77") represents one or more logical interfaces for which ASICs 68 are configured to apply logical interface-specific operations to control packets classified to the logical interfaces. For example, a logical interface 77A may be configured to be associated with a first service class, which is associated with a first priority channel in control unit 98. ASICs 68 processes packets received at physical interface 92A using logical interfaces 77. Each of IFLs 77 has corresponding logical properties specific to that interface, such as a number of the corresponding service class. Each of IFLs 77 represents a logical interface to an interface-specific processing path of processing paths 72 for execution by ASICs 68.

In accordance with techniques of this disclosure, processing path 72 is further configured to execute selector block 83 and logical interface-specific service class operations 79A-79C. PFE 90A configures service class operations 79A for one of IFLs 77, e.g., IFL 77A. Different service class operations 79 correspond to different logical interfaces 77 for the physical network interface 92A. For example, service class operation 79A may be for a first control protocol service class, service class operation 79B may be for a second control protocol service class, and so on. The number and type of service class operations 79 for an IFL 77 may vary, depending for instance on the number of control protocol service classes supported by network device 50. Service class operations 79 may represent forwarding path next-hops, which may be complex instructions for execution by ASICs 68.

In some examples, service class operations 79 including sending received control packets with indications of the determined control protocol service classes for the control packets to DBNG interface 48 for output to DBNG CP system 13. For example, PFE 90A may receive via. IF 92A a control packet. ASICs 68 apply service classifier 76 to the control packet to identify a first control protocol service class using service classification data. The service classification data is configured by DBNG interface 48 to processing path 72 via PFE interface 45 and programming interface 64. The logical interface 77A for the first control protocol service class processes the control packet, selector 83 selects service class operations 79A, and service class operations 79A sends the control packet to DBNG interface 48, via a communication link between PFE 90A and control unit 98, and an indication of the first control protocol service class. Indications of control protocol service classes may be, for instance, strings, integers, bitstrings, flags, ports, and so forth.

DBNG interface 48 sets up and maintains common tunnel 18 with DBNG CP system 13. DBNG interface 48 may receive, from PFE 90A, a control packet and an indication of the control protocol service class determined for the control packet. Based on control protocol service classes 44, DBNG interface 48 sends the control packet to DBNG CP system 13 using the priority channel of priority channels 19 that corresponds to the control protocol service class. Sending the control packet may include encapsulating the control packet in encapsulation headers for the priority channel, e.g. GTP tunnel encapsulation headers with a tunnel endpoint identifier (TEID) specific to the priority channel.

In some examples, service class operations 79 including generating tunnel packets from received control packets based on the determined control protocol service classes for the control packets for output to DBNG CP system 13. For example, PFE 90A may receive via IF 92A a control packet. ASICs 68 apply service classifier 76 to the control packet to identify a first control protocol service class using service classification data. The service classification data is configured by DBNG interface 48 to processing path 72 via PFE interface 45 and programming interface 64. The logical interface 77A for the first control protocol service class processes the control packet, selector 83 selects service class operations 79A, and service class operations 79A sends the control packet via the priority channel of priority channels 19 that corresponds to the control protocol service class. Sending the control packet may include generating, by service class operations 79A, an encapsulated control packet with encapsulation headers that indicate the assigned priority channel and, in some cases, the tunnel, e.g. GTP tunnel encapsulation headers with a tunnel endpoint identifier (TEID) for the tunnel and TCP header data for a TCP connection that is the priority channel for the control packet. The control packet may be output by PFE 90A directly via IF 92N, or the control packet may be output by PFE 90A to control unit 98 for further operations by DBNG interface 48, and then output via one of interface 92.

Although primarily described above with respect to control packets received by network device 50 on an interface with access networks, one or more of the above operations and techniques may be applied by devices of a DBNG CP system to prioritize control packets sent by the DBNG CP system to a DBNG UP device.

Figure 3:
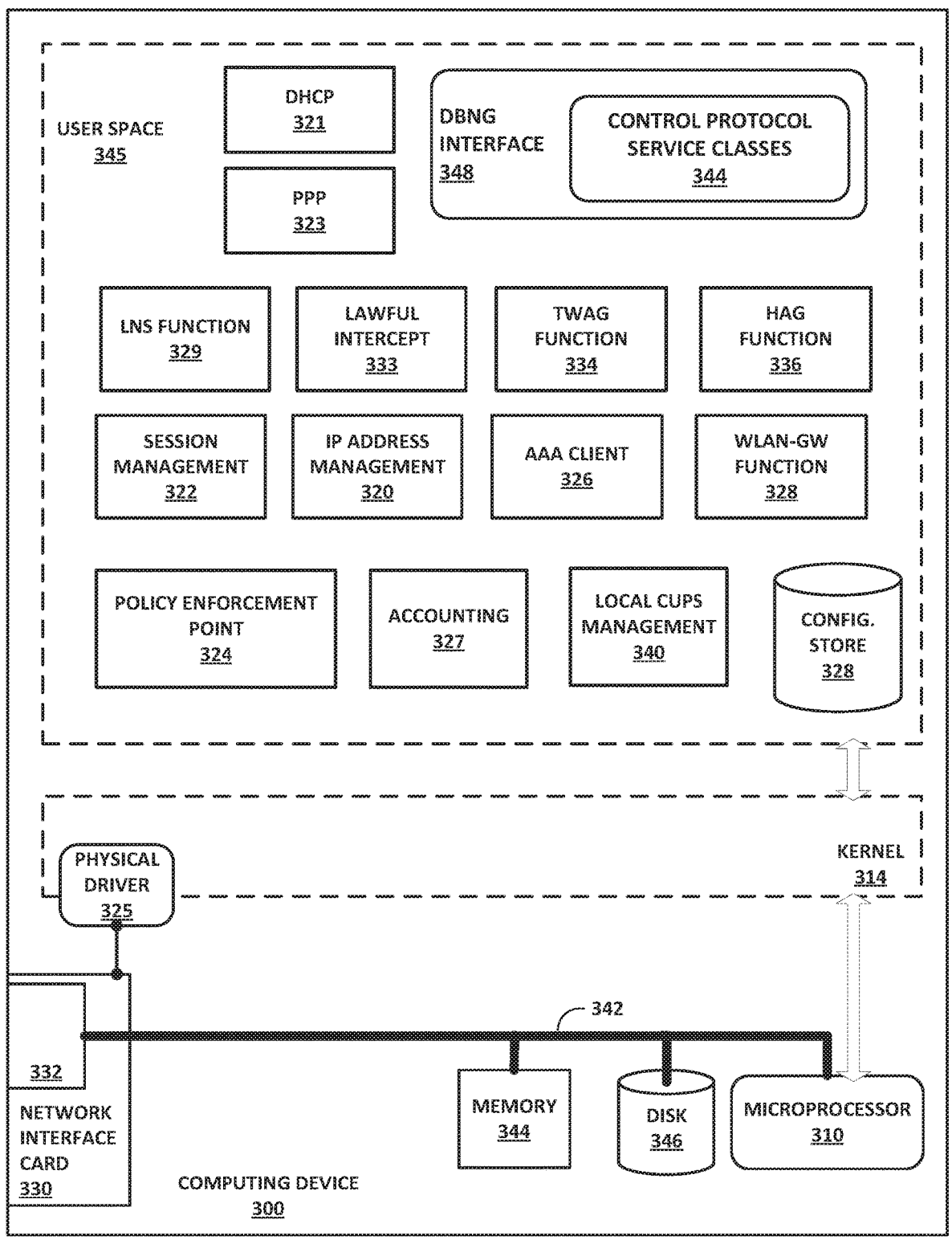
FIG. 3 is a block diagram illustrating an example computing device for implementing a disaggregated broadband network gateway control plane system, according to techniques described herein.

FIG. 3 is a block diagram illustrating an example computing device for implementing a DBNG CP system, according to techniques described herein. Computing device 300 may be one of a plurality of real and/or virtual servers located, for instance, in one or more data centers to provide the DBNG control plane. Whether alone or in combination with other computing devices, these may represent an instance of DBNG CP system 13 of FIG. 1.

L2TP Network Server (LNS) function 329, lawful interface function 333, Trusted WLAN access gateway (TWAG) function 334, Hybrid access gateway (HAG) function 336, session management 322, IP address management 320, DHCP 321, PPP 323, AAA client 326, Wireless LAN gateway (WLAN-GW) function 328, policy decision point (PDP) 324, accounting 327, local Control and User Plane Separations (CUPS) management 340, and configuration store 328 are example DBNG CP functions of the DBNG CP system. Although illustrated and described as being executed by a single computing device 300, these functions may be distributed among multiple computing devices 300 that make up a computing system or hardware/server cluster for DBNG CP system 13. Each of the multiple computing devices 300, in other words, may provide a hardware operating environment for one or more instances of any one or more of the above-listed DBNG CP functions. For example, DHCP 321 performs a Dynamic Host Configuration Protocol function. Fewer or additional DBNG CP functions may be performed by DBNG CP system 13.

Computing device 300 includes in this example, a bus 342 coupling hardware components of a computing device 300 hardware environment. Bus 342 couples network interface card (NIC) 330, storage disk 346, and one or more microprocessors 310 (hereinafter, "microprocessor 310"). A front-side bus may in some cases couple microprocessor 310 and memory device 344. In some examples, bus 342 may couple memory device 344, microprocessor 310, and NIC 330. Bus 342 may represent a Peripheral Component Interface (PCI) express (PCIe) bus. In some examples, a direct memory access (DMA) controller may control DMA transfers among components coupled to bus 242. In some examples, components coupled to bus 342 control DMA transfers among components coupled to bus 342.

Microprocessor 310 may include one or more processors each including an independent execution unit to perform instructions that conform to an instruction set architecture, the instructions stored to storage media. Execution units may be implemented as separate integrated circuits (ICs) or may be combined within one or more multi-core processors (or "many-core" processors) that are each implemented using a single IC (i.e., a chip multiprocessor).

Storage disk 346 represents computer readable storage media that includes volatile and/or non-volatile, removable and/or non-removable media implemented in any method or technology for storage of information such as processor-readable instructions, data structures, program modules, or other data. Computer readable storage media includes, but is not limited to, random access memory (RAM), read-only memory (ROM), EEPROM, Flash memory, CD-ROM, digital versatile discs (DVD) or other optical storage, magnetic cassettes, magnetic tape, magnetic disk storage or other magnetic storage devices, or any other medium that can be used to store the desired information and that can be accessed by microprocessor 310.

Main device 344 includes one or more computer-readable storage media, which may include random-access memory (RAM) such as various forms of dynamic RAM (DRAM), e.g., DDR2/DDR3 SDRAM, or static RAM (SRAM), flash memory, or any other form of fixed or removable storage medium that can be used to carry or store desired program code and program data in the form of instructions or data structures and that can be accessed by a computer. Main device 344 provides a physical address space composed of addressable memory locations.

Network interface card (NIC) 330 includes one or more interfaces 332 configured to exchange packets using links of an underlying physical network. Interfaces 332 may include a port interface card having one or more network ports. NIC 330 may also include an on-card memory to, e.g., store packet data. Direct memory access transfers between the NIC 330 and other devices coupled to bus 342 may read/write from/to the NIC memory.

Memory 344, NIC 330, storage disk 346, and microprocessor 310 may provide an operating environment for a software stack that includes an operating system kernel 314 executing in kernel space. Kernel 314 may represent, for example, a Linux, Berkeley Software Distribution (BSD), another Unix-variant kernel, or a Windows server operating system kernel, available from Microsoft Corp. In some instances, the operating system may execute a hypervisor and one or more virtual machines managed by hypervisor. Example hypervisors include Kernel-based Virtual Machine (KVM) for the Linux kernel, Xen, ESXi available from VMware; Windows Hyper-V available from Microsoft; and other open-source and proprietary hypervisors. The term hypervisor can encompass a virtual machine manager (VMM). An operating system that includes kernel 314 provides an execution environment for one or more processes in user space 345. Kernel 314 includes a physical driver 325 to use the network interface card 230.

Computing device 300 may be coupled to a physical network switch fabric that includes an overlay network that extends switch fabric from physical switches to software or "virtual" routers of physical servers coupled to the switch fabric.

Computing device 344 further includes DBNG interface 348 and control protocol service classes 344, which may be similar to DBNG interface 48 and control protocol service classes 44 of FIG. 2 in some cases. In general, DBNG interface 348 establishes a common tunnel 18 with a DBNG UP device and exchange control packets for control protocols with the DBNG UP device via multiple priority channels transported by common tunnel 18 for the priority channels.

DBNG interface 48 receives control packets on the priority channels and processes the control packets according to priority characteristics of the priority channels, which may correspond to priority or processing needs of control packets classified to the control protocol service classes for the priority channel. For example, control protocol service classes 344 may specify that control packets classified to a first control protocol service class should be processed so as to meet a<X ms latency requirement. DBNG interface 348 may therefore establish queues, weighted queues, other data structure, and/or other priority processing mechanism in order that computing device 300 may process control packets received on the priority channel, transported by the shared tunnel, that corresponds to the first control protocol service class.

DBNG interface 348 or another process/device may spawn additional instances (such as container or virtual machines) for performing the DBNG CP functions in order to meet priority processing requirements based on processing metrics determined by computing device. For example, if the queue length for a queue of control packets for a first control protocol service class exceeds a threshold number of control packets, DBNG CP system 13 may spawn another instance and load balance further control packets for the first control protocol service class to another instance.

After a DBNG CP function processes a control packet, the DBNG CP function may generate a control packet response, which is another control packet. DBNG interface 348 may process the control packet response to classify it to a control protocol service class and send the control packet response to a DBNG UP device on the corresponding priority channel, transported by the shared tunnel, for the control protocol service class.

Figure 4:
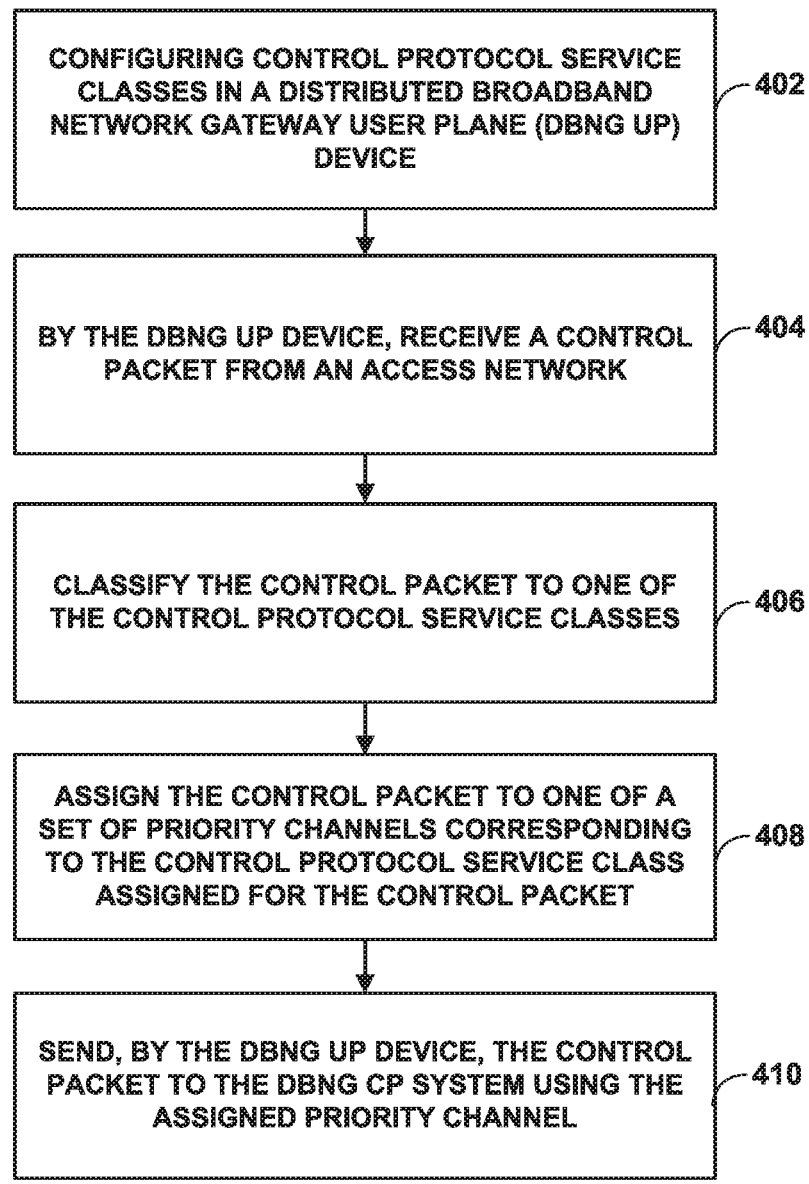
FIG. 4 is a flowchart illustrating an example mode of operation for a disaggregated broadband network gateway user plane device, according to techniques described in this disclosure.

FIG. 4 is a flowchart illustrating an example mode of operation for a DBNG UP device, according to techniques described in this disclosure. The mode of operation is described by example DBNG UP device 10 and network device 50 of FIG. 1 but may be implemented by other examples of DBNG UP devices.

An operator or other entity or software configures control protocol service classes 44 that include control protocol service classification data for classifying control protocol control packets to control protocol service classes (402). Control protocol service classes 44 may also specify priority characteristics for each of priority channels 19, which define how quickly, for instance, DBNG UP device 10 is to process the control packets assigned to each of the priority channels 19.

DBNG UP device 10 receives a control packet from access network 6 (404). DBNG UP device 10 applies control protocol service classification data to the control packet to classify the control packet to one of the control protocol service classes (406). DBNG UP device 10 then assigns the control packet, based on the control protocol service class for the control packet, to one of priority channels 19 (408). DBNG UP device 10 the sends the control packet to DBNG CP system 13 on the common tunnel 18 using the assigned priority channel (410).

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively, or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random-access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

What is claimed is:

1. A method comprising:
receiving, by a disaggregated broadband network gateway (DBNG) user plane device, via at least one of a command line interface or Simple Network Management Protocol command, control protocol service classification data that defines a plurality of control protocol service classes, the control protocol service classification data including data usable for control protocol identification;
applying, by the DBNG user plane device, the control protocol service classification data to identify a control protocol of a control packet and, based on the identified control protocol, classify the control packet to a control protocol service class of the control protocol service classes;
assigning, by the DBNG user plane device, the control packet to an assigned priority channel of a plurality of priority channels within a common tunnel for a shared interface with a DBNG control plane system, the DBNG user plane device physically separate from the DBNG control plane system, the assigned priority channel corresponding to the control protocol service class for the control packet; and sending, by the DBNG user plane device, the control packet to the DBNG control plane system using the assigned priority channel.

2. The method of claim 1, wherein assigning the control packet comprises assigning, based at least on the control protocol, the control packet to the assigned priority channel.

3. The method of claim 1,
wherein the common tunnel comprises a General Packet Radio Service (GPRS) Tunneling Protocol (GTP) tunnel, and
wherein each of the plurality of priority channels comprises a different Internet Protocol (IP) channel transported by the GTP tunnel.

4. The method of claim 1,
wherein the common tunnel comprises an IP channel, and
wherein each of the priority channels is a different General Packet Radio Service (GPRS) Tunneling Protocol (GTP) tunnel associated with a tunnel endpoint identifier (TEID).

5. The method of claim 1, wherein each of the plurality of priority channels comprises a different transmission control protocol (TCP) connection or user datagram protocol (UDP) channel between the DBNG user plane device and the DBNG control plane system.

6. The method of claim 1, wherein a priority of each of the priority channels is indicated by Differentiated Service Code Points in packet headers encapsulating the control packets.

7. The method of claim 1, wherein the shared interface comprises a Control packet Redirection Interface.

8. The method of claim 1,
wherein the DBNG user plane device comprises a router comprising a control unit and a line card,
wherein assigning the control packet comprises:
processing, by a hardware-based packet processor of the line card of the router, the control packet to classify the control packet to the control protocol service class;
sending, by the hardware-based packet processor, to the control unit of the network router, the control packet and an indication of the control protocol service class of the control packet; and
assigning, by the control unit of the network router based on the indication of the control protocol service class of the control packet, the control packet to the priority channel.

9. The method of claim 1,
wherein the DBNG user plane device comprises a router comprising a control unit and a line card comprising a hardware-based packet processor, the method further comprising:
classifying, by the hardware-based packet processor, the control packet to the control protocol service class of the plurality of control protocol service classes.

10. The method of claim 9, further comprising:
sending, by the line card to the control unit, the control packet to the control unit and an indication of the classified control protocol service class for the control packet,
wherein assigning the control packet further comprises assigning the control packet to the assigned priority channel based on the indication of the classified control protocol service class for the control packet.

11. The method of claim 9, wherein sending the control packet further comprises:

generating, by the hardware-based packet processor, an encapsulated control packet that includes the control packet and a tunnel encapsulation header that indicates the assigned priority channel; and
sending, by the line card, the encapsulated control packet to the DBNG control plane system.

12. A Disaggregated Broadband Network Gateway User Plane device comprising:
memory; and
processing circuitry coupled with the memory, the processing circuitry and memory being configured to:
receive, via at least one of a command line interface or Simple Network Management Protocol command, control protocol service classification data that defines a plurality of control protocol service classes, the control protocol service classification data including data usable for control protocol identification;
apply the control protocol service classification data to identify a control protocol of a control packet and, based on the identified control protocol, classify the control packet to a control protocol service class of the control protocol service classes;
assign the control packet to an assigned priority channel of a plurality of priority channels within a common tunnel for a shared interface with a physically separate DBNG control plane system, the assigned priority channel corresponding to the control protocol service class for the control packet; and
send the control packet to the DBNG control plane system using the assigned priority channel.

13. The device of claim 12, wherein to assign the control packet the processing circuitry and memory are configured to assign, based at least on the control protocol, the control packet to the assigned priority channel.

14. The device of claim 12, wherein the common tunnel comprises a General Packet Radio Service (GPRS) Tunneling Protocol (GTP) tunnel.

15. The device of claim 12,
wherein the common tunnel comprises a General Packet Radio Service (GPRS) Tunneling Protocol (GTP) tunnel, and
wherein each of the plurality of priority channels comprises a different Internet Protocol (IP) channel transported by the GTP tunnel.

16. The device of claim 12, wherein each of the plurality of priority channels comprises a different transmission control protocol (TCP) connection or user datagram protocol (UDP) channel between the DBNG user plane device and the DBNG control plane system.

17. The device of claim 12, wherein the shared interface comprises a Control packet Redirection Interface.

18. A Disaggregated Broadband Network Gateway system comprising:
a Disaggregated Broadband Network Gateway User Plane device configured to:
receive, via at least one of a command line interface or Simple Network Management Protocol command, control protocol service classification data that defines a plurality of control protocol service classes, the control protocol service classification data including data usable for control protocol identification;
apply the control protocol service classification data to identify a control protocol of a control packet and, based on the identified control protocol, classify the control packet to a control protocol service class of the control protocol service classes;

assign the control packet to an assigned priority channel of a plurality of priority channels within a common tunnel for a shared interface with a Disaggregated Broadband Network Gateway Control Plane system, the assigned priority channel corresponding to the control protocol service class for the control packet; and send the control packet to the Disaggregated Broadband Network Gateway Control Plane system using the assigned priority channel; and the Disaggregated Broadband Network Gateway Control Plane system configured to:

receive the control packet on the assigned priority channel; and process the control packet according to a priority associated with the assigned priority channel.

19. The system of claim 18, wherein the common tunnel comprises a General Packet Radio Service (GPRS) Tunneling Protocol tunnel.

* * * * *